United States Patent [19]

Gambino et al.

[11] Patent Number: 5,154,514
[45] Date of Patent: Oct. 13, 1992

[54] ON-CHIP TEMPERATURE SENSOR UTILIZING A SCHOTTKY BARRIER DIODE STRUCTURE

[75] Inventors: Jeffrey P. Gambino, Gaylordsville, Conn.; Louis L. Hsu, Fishkill, N.Y.; Michael A. Lee, Madison, Wis.; Krishna Seshan, Beacon, N.Y.; Alvin Sugerman, Hopewell Junction, N.Y.; Francis E. Turene, Pleasant Valley, N.Y.

[73] Assignee: International Business Machines Corporation, Armonk, N.Y.

[21] Appl. No.: 751,490

[22] Filed: Aug. 29, 1991

[51] Int. Cl.5 .................... G01K 7/00; H01L 31/108; H01L 27/14
[52] U.S. Cl. .................................. 374/178; 357/10; 357/15; 357/28
[58] Field of Search .............. 374/178; 357/10, 15, 357/28

[56] References Cited

U.S. PATENT DOCUMENTS

| | | | |
|---|---|---|---|
| 3,719,797 | 3/1973 | Andrews, Jr. et al. | 374/178 |
| 3,812,717 | 5/1974 | Miller et al. | 374/178 |
| 3,906,540 | 9/1975 | Hollins | 357/15 |
| 4,206,472 | 6/1980 | Chu et al. | 357/71 P |
| 4,361,599 | 11/1982 | Wourms | 427/90 |
| 4,394,672 | 7/1983 | Meitzler et al | 357/10 |
| 4,533,935 | 8/1985 | Mochizuki | 357/51 |
| 4,544,939 | 10/1985 | Kosonocky et al. | 357/15 |
| 4,619,035 | 10/1986 | Hotta et al. | 29/576 |
| 4,643,589 | 2/1987 | Krause et al. | 374/178 |
| 4,698,659 | 10/1987 | Mizutani | 357/71 |
| 4,714,951 | 12/1987 | Baudrant et al. | 357/67 |
| 4,744,672 | 5/1988 | Tursky et al. | 374/178 |
| 4,808,009 | 2/1989 | Sittler et al. | 374/178 |
| 4,854,731 | 8/1989 | Jenkins | 374/178 |
| 4,857,973 | 8/1989 | Yang et al. | 357/15 |
| 4,882,296 | 11/1989 | Hoheisel et al. | 357/2 |

FOREIGN PATENT DOCUMENTS

| | | | |
|---|---|---|---|
| 1011009 | 6/1957 | Fed. Rep. of Germany | 357/10 |
| 0113372 | 9/1980 | Japan | 357/15 A |
| 0180052 | 10/1983 | Japan | 357/15 |
| 0072181 | 4/1984 | Japan | 357/15 |
| 0200577 | 8/1988 | Japan | 357/15 |
| 0260468 | 10/1990 | Japan | 357/15 |

Primary Examiner—William A. Cuchlinski, Jr.
Assistant Examiner—Diego F. F. Gutierrez
Attorney, Agent, or Firm—Jeffrey L. Brandt; Harold Huberfeld

[57] ABSTRACT

A temperature sensor, comprising: a diode structure including, a) a silicon substrate, b) a first region of a metal silicide in the silicon substrate, c) a second region of a metal-oxide semiconductor material on the first region, d) a third region of a metal over the second region; and, means for using the diode structure as a temperature sensitive device to measure an ambient temperature. The metal-oxide semiconductor material is preferably selected to have a bandgap of not less than about 3.0 eV.

14 Claims, 2 Drawing Sheets

ON-CHIP TEMPERATURE SENSOR UTILIZING A SCHOTTKY BARRIER DIODE STRUCTURE

The present invention is directed generally to a temperature sensor and more particularly to a temperature sensor utilizing a temperature-sensitive diode.

BACKGROUND OF THE INVENTION

In the operation of a semiconductor chip, for example of the type packaged for operation in a computer or other larger system, it is desirable to be able to measure and monitor chip temperature while the chip is powered up and running. Such temperature monitoring can be used, for example, to identify occurrences of overheating, and to initiate the shutdown of the system so as to avoid extensive damage. It is desirable that such temperature monitoring can be performed in ranges from cryogenic to well above that of typical, ambient operating temperatures, i.e from 77 Kelvin (K.) to 400 K.

It is well known in the art to use a conventional, homojunction diode as a temperature sensitive device, the turn-on voltage of the diode being indicative of the ambient diode junction temperature. Due to carrier freeze-out effects, however, the characteristics of pn semiconductor junction diodes change dramatically at very low temperatures (i.e. <100 K.), requiring that at least one side of the junction be heavily doped to provide an ohmic, metal-semiconductor contact. Such diodes require extra processing steps to manufacture, and provide less than optimal room-temperature performance.

Silicon and germanium diodes inherently have a very small variation in the range of their turn-on voltages, typically less than about 1.2 V and 0.6 V, respectively, making accurate temperature determinations difficult.

It is thus difficult to provide diode-based temperature sensing circuits having both large temperature ranges and accuracy.

U.S. Pat. No. 4,854,731 to Jenkins shows a temperature sensing circuit utilizing diodes set in polysilicon and spaced from a semiconductor element by a dielectric layer. A temperature measuring circuit is connected to the diodes, the circuit using the diodes as temperature sensitive devices, whereby to measure the temperature of the semiconductor element. Various characteristics of the diodes, such as current flow or turn-on voltage, are used to determine the temperature of the diodes and hence the semiconductor element. As noted above, diodes of the type shown in Jenkins are typically not capable of use at cryogenic temperatures.

U.S. Pat. No. 3,812,717 to Miller et al. shows a temperature sensing circuit utilizing a diode wherein the thickness of the zero bias depletion layer is more than about four times the carrier diffusion length. In an indirect bandgap material, such as silicon, this is accomplished using an intrinsic layer at the pn junction. Using direct bandgap materials such as GaAs, this is accomplished by design. The thusly formed diode is used in a current switching circuit, with the voltage drop across the diode measured to determine the temperature of the diode. This teaching by Miller et al. suffers from the complexity of the current switching circuit required to measure the temperature.

U.S. Pat. No. 4,643,589 Krause et al. shows a thermometry system employing a galium aluminum arsenide diode sensor. While the system is reported to be accurate and stable over a wide range of temperatures, it suffers from the inherent drawback of being constructed of gallium arsenide. Gallium arsenide and gallium aluminum arsenide diodes cannot be incorporated in silicon-based semiconductor chips.

It would thus be desirable to provide a temperature sensitive diode, for use in a temperature sensing circuit, which is accurate over a wide range of temperatures. Such a system would be particularly useful if the thermometry circuit was simple in implementation, and even more useful if the entire system could be integrated on a single, silicon-based chip.

OBJECTS OF THE INVENTION

A principle object of the present invention is to provide a new and improved temperature sensing circuit incorporating a temperature sensitive diode which is accurate over a large range of temperatures.

Another object of the present invention is to provide such a temperature sensing circuit which can be integrated on a silicon-based substrate for on-chip measurements.

Yet another object of the present invention is to provide such a temperature sensing circuit wherein the diode can be formed using conventional semiconductor device manufacturing processes and materials.

A further object of the present invention is to provide such a temperature sensing circuit wherein the electronic circuitry is straightforward in construction and not unduly complex.

SUMMARY OF THE INVENTION

In accordance with the present invention, there is provided a new and improved temperature sensor, comprising: a diode structure including, a) a silicon substrate, b) a first region of a metal silicide in the silicon substrate, b) a second region of a metal-oxide semiconductor material on the first region, c) a third region of a metal over the second region; and, means for using the diode structure as a temperature sensitive device to measure an ambient temperature. The metal-oxide semiconductor material forms a Schottky Barrier contact with the metal silicide region, and is preferably selected to have a bandgap of not less than about 3.0 eV.

In accordance with another aspect of the present invention, there is provided a method of sensing a temperature comprising the steps of: providing a diode structure including, a) a silicon substrate, b) a first region of a metal silicide in the silicon substrate, c) a second region of a metal-oxide semiconductor material on the first region, d) a third region of a metal over the second region; and measuring, using the diode structure as a temperature sensitive device, an ambient temperature.

BRIEF DESCRIPTION OF THE FIGURES

These and other objects, features, and advantages of the present invention will become apparent from a consideration of the following Detailed Description of the Invention, in conjunction with the drawing Figures, in which.

DETAILED DESCRIPTION OF THE INVENTION

Figure 1:
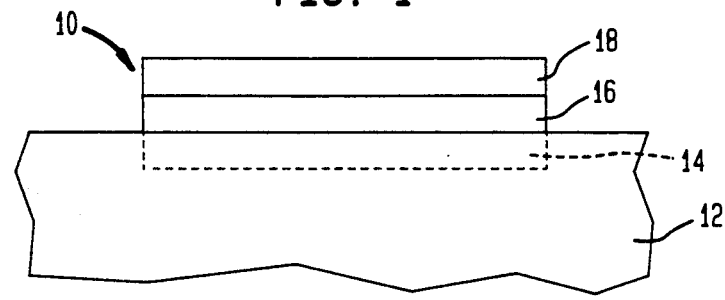
FIG. 1 is a cross-sectional view of a Schottky Barrier Diode structure constructed in accordance with the present invention.

Referring now to the drawings, FIG. 1 shows a Schottky Barrier Diode (SBD) structure 10 formed on a silicon substrate 12. Diode 10 includes a layer of titanium silicide ($TiSi_{1<x<2}$) 14 formed in the substrate 12, a layer of titanium oxide ($TiO_{1<y<2}$) semiconductor material 16 over the layer of $TiSi_x$, and a layer of aluminum 18 over the layer of $TiO_y$.

Diode 10 may be formed, for example, by the following steps:

a) providing silicon substrate 12 lightly p doped so as to have a resistivity in the range of about 1-2 ohm-cm;

b) cleaning the upper surface of substrate 12 using a diluted silicon etch solution, for example a mixture of $HNO_3$/HAc/HF;

c) sputter depositing a 50 nm layer of Ti over the cleaned surface of substrate 12;

d) oxidizing the structure in an oxygen ambient environment at about 600 degrees centigrade for about thirty minutes to completely oxidize the Ti film and so as to also form $TiSi_x$ layer 14 in substrate 12; and e) evaporating aluminum to form layer 18 over layer 16.

Diode 10 thus formed is estimated to have an effective band-gap in the range of 2.8-3.8 eV, which is close to the 3.0 eV bandgap of $TiO_2$.

The present inventors have discovered that a diode constructed in accordance with the above-described teaching is particularly sensitive to variations in temperature over a wide range of temperatures.

Further, while diode 10 is shown as constructed with titanium to form the metal-silicide and metal-oxide in layers 14 and 16, respectively, it is not thus limited. Any metal forming a wide-bandgap (§3.0 eV) metal-oxide semiconductor layer with a Schottky contact to layer 14 will suffice for layer 16. For example, nickel, chromium, cobalt, or tantalum could be used instead of titanium. With respect to metal layer 18, any metal forming a high barrier Schottky contact to layer 16 will suffice. Appropriate other metals for layer 18 include tungsten, gold, and silver.

Figure 2:
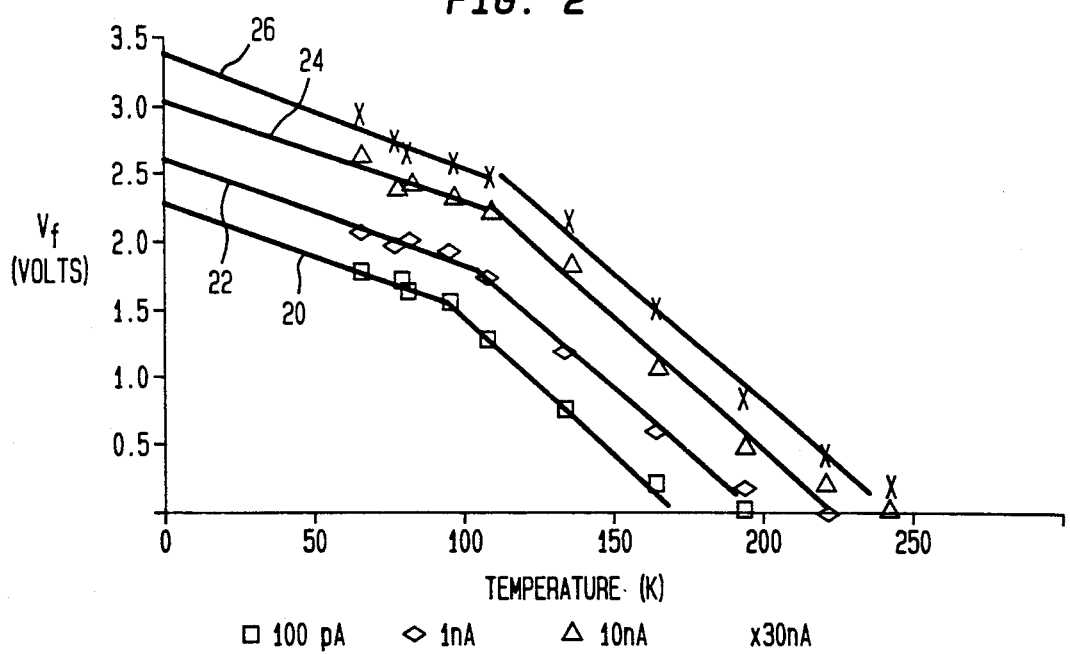
FIG. 2 is a graph including plots of turn on voltage $V_F$ versus temperature (Kelvin) for different currents for the diode of FIG. 1.

With reference to FIG. 2, a graph is shown of diode turn-on voltage $V_f$ vs. temperature in Kelvin. Four different curves are shown, plot 20 at 100 pA of forward current, and plots 22, 24, and 26 at 1 nA, 10 nA, and 30 nA of forward current, respectively.

As shown in the graph, there is substantial variation in $V_F$ (of between about 0-2.5 V, and 0-3.5 V), for each forward current, over temperature ranges from 0 K. to up to 250 K. Further, each of the plots is relatively linear, with a change in slope occurring about 100 K. The diode characteristics are thus relatively sensitive and accurate over a broad range of 0-250 K., with even more sensitivity (due to the increased slope) in the range of 100-250 K. As is apparent from extending the data shown in the graph of FIG. 2, a forward current of about 100 nA will operate diode 10 in a range extending up to about 400 K.

Figure 3:
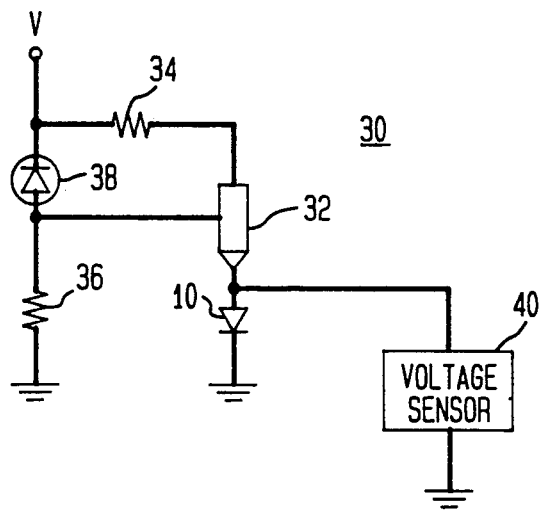
FIG. 3 is a diagrammatic view of an electronic temperature sensing circuit incorporating the diode structure of FIG. 1.

Referring now to FIG. 3, a temperature sensing circuit 30 is shown utilizing diode 10 as a temperature sensitive device. Circuit 30 includes a bipolar, npn transistor 32, a pair of resistors 34, 36, a second diode 38, and a voltage sensor 40.

Transistor 32 has an emitter region connected in parallel to the anode of diode 10 and to the input to voltage sensor 40. The cathode of diode 10 and the reference of voltage sensor 40 are both connected to a system ground.

The base of transistor 32 is connected to the system ground through resistor 36, and to a bias voltage V through the anode-cathode path of diode 38. The collector of transistor 32 is connected to bias voltage V through resistor 34.

In operation, diode 38, resistors 34, 36, transistor 32, and bias voltage V are used to establish a selected input current level at the anode of diode 10. Voltage sensor 40 functions to measure the turn-on voltage of diode 10 and, when the ambient temperature of the diode changes so as to cause the diode to conduct (or stop conducting), voltage sensor 40 will sense an accompanying change of turn-on voltage at the anode of diode 10. Based on the voltage at which diode 10 switched, and the known characteristics of the diode (FIG. 2), the ambient temperature of the diode can be accurately determined.

It is well understood in the art that all of the components of temperature sensing circuit 30 can be integrated onto a silicon semiconductor chip, using conventional fabrication processes and devices.

Figure 4:
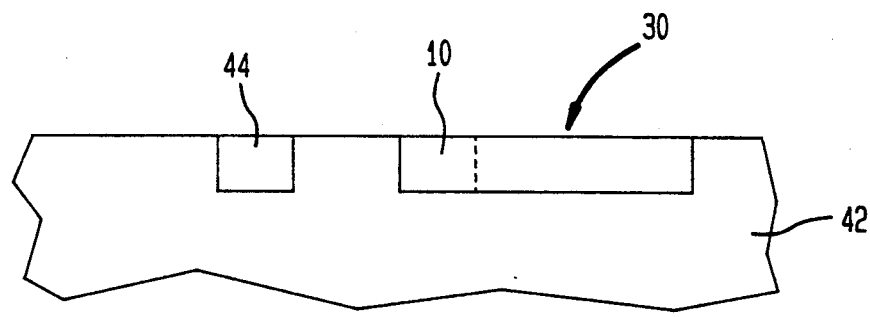
FIG. 4 is a diagrammatic view of the temperature sensing circuit of FIG. 3 incorporated in a silicon semiconductor chip.

Referring now to FIG. 4, there is shown diagrammatically the incorporation of temperature sensing circuit 30 into a silicon semiconductor chip 42. Circuit 30 is formed such that diode 10 is proximate a chip device 44 (e.g. a transistor, diode, resistor, etc. . . .). Diode 10 can thus be used to monitor the ambient temperature of chip 42 proximate device 44. The output of circuit 30 can be used, for example, to monitor the temperature of chip 42, and even to shut down power to the chip should the temperature exceed an expected value.

There has thus been provided a temperature sensing circuit, using a metal/metal-oxide/metal-semiconductor diode structure, which is sensitive and accurate over a temperature range from cryogenic to over 400 Kelvin. Selection of the forward diode current can be used to vary the temperature range over which the diode is sensitive. The circuit is inexpensive and straightforward to manufacture, and can be integrated onto a silicon-based semiconductor chip, with other circuits and devices, utilizing conventional semiconductor manufacturing processes and materials.

The invention has application in the field of semiconductor devices, and the operation of semiconductor devices wherein it is desirable to monitor device, circuit, and chip temperatures.

While the invention has been shown and described with respect to specific embodiments, numerous modifications, changes, and improvements, falling within the spirit and scope of the invention, will occur to those skilled in the art.

What is claimed is:

1. A temperature sensor, comprising:
   a diode structure including,
   a) a silicon substrate,
   b) a first region of a metal silicide in said silicon substrate,
   c) a second region of a metal-oxide semiconductor material on said first region, d) a third region of a metal over said second region; and means using said diode structure as a temperature sensitive device for measuring an ambient temperature.

2. The temperature sensor of claim 1 wherein said metal-oxide semiconductor material has a bandgap of not less than about 3.0 eV.

3. The temperature sensor of claim 1 wherein the metal in said metal silicide and said metal-oxide regions is selected from the group comprising titanium, nickel, cobalt, chromium, and tantalum.

4. The temperature sensor of claim 1 wherein said third region metal is selected from the group comprising aluminum, tungsten, gold, and silver.

5. The temperature sensor of claim 1 wherein said ambient temperature measuring means includes an electronic circuit.

6. The temperature sensor of claim 5 wherein said electronic circuit includes means connected to said diode structure for generating a signal indicative of said ambient temperature.

7. The temperature sensor of claim 5 wherein said electronic circuit includes:
means for establishing a supply current to said diode structure; and
means for sensing the turn-on voltage at the anode of said diode structure.

8. The temperature sensor of claim 1 wherein said diode structure and said ambient temperature measuring means are disposed on a single semiconductor chip, said ambient temperature comprising the temperature of the semiconductor chip in the region of said diode.

9. The temperature sensor of claim 1 wherein:
said region of metal-oxide forms a Schottky contact to said region of metal silicide; and
said region of metal forms a Schottky contact to said region of metal-oxide.

10. A method of sensing a temperature comprising the steps of:
providing a diode structure including,
a) a silicon substrate,
b) a first region of a metal silicide in said silicon substrate,
c) a second region of a metal-oxide semiconductor material on said first region,
d) a third region of a metal over said second region; and measuring, using said diode structure as a temperature sensitive device, an ambient temperature.

11. The method of claim 10 wherein said metal-oxide semiconductor material has a bandgap of not less than about 3.0 eV.

12. The method of claim 10 wherein the metal in said metal silicide and said metal-oxide regions is selected from the group comprising titanium, nickel, cobalt, chromium, and tantalum.

13. The method of claim 10 wherein said third region metal is selected from the group comprising aluminum, tungsten, gold, and silver.

14. The temperature sensor of claim 10 wherein:
said region of metal-oxide forms a Schottky contact to said region of metal silicide; and
said region of metal forms a Schottky contact to said region of metal-oxide.

* * * * *